(12) United States Patent
Zhang et al.

(10) Patent No.: US 10,780,609 B2
(45) Date of Patent: Sep. 22, 2020

(54) FIBER-REINFORCED COMPOSITE ARTICLES AND METHODS OF MAKING THEM

(71) Applicant: JOHNS MANVILLE, Denver, CO (US)

(72) Inventors: Mingfu Zhang, Highlands Ranch, CO (US); Jawed Asrar, Englewood, CO (US); Klaus Friedrich Gleich, Nuremberg (DE); Asheber Yohannes, Littleton, CO (US)

(73) Assignee: Jonhs Manville, Denver, CO (US)

( * ) Notice: Subject to any disclaimer, the term of this patent is extended or adjusted under 35 U.S.C. 154(b) by 14 days.

(21) Appl. No.: 15/820,293

(22) Filed: Nov. 21, 2017

(65) Prior Publication Data

US 2018/0093396 A1   Apr. 5, 2018

Related U.S. Application Data

(62) Division of application No. 13/915,002, filed on Jun. 11, 2013, now Pat. No. 9,855,680.

(51) Int. Cl.
*B29B 15/10* (2006.01)
*D06M 15/59* (2006.01)
(Continued)

(52) U.S. Cl.
CPC ............ *B29B 15/10* (2013.01); *B29B 15/105* (2013.01); *B29B 15/12* (2013.01); *B29B 15/14* (2013.01);
(Continued)

(58) Field of Classification Search
CPC .... D06M 15/507; D06M 15/51; D06M 15/59; D06M 13/03; D06M 15/61; C08J 2377/00; C08J 2367/02; C08J 5/24; C08J 2300/22; C08J 2377/02; C08J 5/08; C08J 5/06; C08J 2377/06; B29B 15/12; B29B 15/10; B29B 15/105; B29B 5/12; B29B 15/14; B29B 15/122; Y10T 428/254; Y10T 428/268; Y10T 428/269; Y10T 428/30; Y10T 428/31721; Y10T 442/20; Y10T 442/28;
(Continued)

(56) References Cited

U.S. PATENT DOCUMENTS 4,898,616 A   2/1990   Hyche et al.
5,128,198 A   7/1992   Dyksterhouse et al.
(Continued)

FOREIGN PATENT DOCUMENTS

EP   0 272 648 A2   6/1988
EP   0 424 833 B1   1/1996
(Continued)

*Primary Examiner* — Camie S Thompson
(74) *Attorney, Agent, or Firm* — Robert D. Touslee

(57) ABSTRACT

Methods of making prepregs are described. The methods include the steps of forming a fiber-containing substrate, and contacting the fiber-containing substrate with a resin mixture. The resin mixture may include polymer particles mixed in a liquid medium, and the polymer particles may be coated on the fiber-containing substrate to form a coated substrate. The liquid medium may be removed from the coated substrate to form the prepreg. The prepregs may be used to make fiber-reinforced articles.

19 Claims, 5 Drawing Sheets

(51) Int. Cl.
*D06M 15/51* (2006.01)
*D06M 15/507* (2006.01)
*D06M 13/03* (2006.01)
*B29B 15/12* (2006.01)
*B29B 15/14* (2006.01)
*C08J 5/24* (2006.01)

(52) U.S. Cl.
CPC ............... *C08J 5/24* (2013.01); *D06M 13/03* (2013.01); *D06M 15/507* (2013.01); *D06M 15/51* (2013.01); *D06M 15/59* (2013.01); *C08J 2367/02* (2013.01); *C08J 2377/00* (2013.01); *Y10T 442/20* (2015.04)

(58) Field of Classification Search
CPC . Y10T 428/249948; Y10T 428/249933; Y10T 428/24997; Y10T 442/2992; Y10S 428/902; B29K 2105/0064; B29K 2067/00; B29K 2105/0002; B29K 2105/0014; B29K 2067/006; B29K 2105/0872; B29K 2105/089; B29K 2105/256; B29C 70/54; B29C 70/04; B29C 70/465; B29C 70/506; B29C 37/0032; B29C 67/246; B29C 70/36; B29C 70/443; B29C 70/06; B29C 70/48; C03C 13/00; C03C 25/328; C08L 77/02; C09D 67/02; F05D 2220/30; F05D 2230/30; F05D 2300/43; F05D 2300/6012; F05D 2300/611; F03D 1/0675; F01D 5/282; C08K 7/14; C08K 5/5442; B32B 2262/101; B32B 2262/10; B32B 2262/103; B32B 2262/106; B32B 2305/076; B32B 2603/00; B32B 27/12; B32B 27/34; B32B 5/024; B32B 5/32
USPC .... 427/212, 221, 211; 442/59, 60, 180, 187; 428/473.5, 902, 327, 338, 339, 698, 428/300.1, 295.1, 299.7, 300.4; 156/307.5, 181, 180, 307.4, 279; 264/136, 324, 45.1, 257, 258, 137; 502/100; 528/26, 27; 8/115.6; 523/222
See application file for complete search history.

(56) References Cited

U.S. PATENT DOCUMENTS

| | | |
|---|---|---|
| 6,994,914 B2 | 2/2006 | Winckler et al. |
| 7,151,143 B2 | 12/2006 | Wang et al. |
| 2007/0182046 A1 | 8/2007 | Henne et al. |
| 2007/0182047 A1* | 8/2007 | Henne ................. B29C 37/0032 264/45.1 |
| 2010/0203328 A1* | 8/2010 | Hochstetter et al. |
| 2011/0021737 A1* | 1/2011 | Tadepalli ................ B29C 70/36 528/26 |

FOREIGN PATENT DOCUMENTS

| | | |
|---|---|---|
| GB | 2 168 361 A | 6/1986 |
| WO | 2001/053379 A1 | 7/2001 |
| WO | 2009/075901 A1 | 6/2009 |
| WO | 2009/076499 A1 | 6/2009 |

* cited by examiner

FIBER-REINFORCED COMPOSITE ARTICLES AND METHODS OF MAKING THEM

CROSS-REFERENCE TO RELATED APPLICATIONS

This application is a division of U.S. patent application Ser. No. 13/915,002 filed Jun. 11, 2013, and titled "FIBER-REINFORCED COMPOSITE ARTICLES AND METHODS OF MAKING THEM," the entire disclosure of which is hereby incorporated by reference, for all purposes, as if fully set forth herein.

BACKGROUND

Thermoset plastics are favored for making many kinds of fiber-reinforced articles because of their ease of manufacture. Uncured thermosets are often low viscosity liquids at room temperature and easily wet a fabric of fibers. Once they have migrated through the fabric and surrounded its fibers, a curing stage (sometimes called a hardening stage) commences to polymerize the thermoset into a polymer matrix. Often, this wetting and curing takes place in a mold that defines the shape of the fiber-reinforced article.

The uncured thermoset resins used to make the composite are generally inexpensive, but often off gas irritating and sometimes dangerous volatile organic compounds (VOCs). The outgassing of VOCs are of particular concern during curing, when the exothermic nature of many thermoset polymerization reactions raise the temperature of the composite and drive more VOCs into the gas phase. In many instances, it is necessary to cure large thermoset articles in facilities equipped with robust ventilation and air scrubbing equipment, increasing the overall production costs.

Thermoset articles are also difficult to repair or recycle. Hardened thermoset binders often have a high degree of crosslinking, making them prone to fractures and breaks. Because thermosets normally will not soften or melt under heat, they have to be replaced instead of repaired by welding. Compounding difficulties, the unrepairable thermoset part normally cannot be recycled into new articles, but must instead be landfilled at significant cost and adverse impact on the environment. The problems are particularly acute when large thermoset parts, such as automotive panels and wind turbine blades, need to be replaced.

Because of these and other difficulties, thermoplastic resin systems are being developed for fiber-reinforced articles that were once exclusively made using thermosets. Thermoplastics typically have higher fracture toughness and chemical resistance than thermosets. They also soften and melt at raised temperatures, allowing operators to heal cracks and weld together pieces instead of having to replace a damaged part. Perhaps most significantly, discarded thermoplastic parts can be broken down and recycled into new articles, reducing landfill costs and stress on the environment.

Unfortunately, many thermoplastics also have production challenges, including high flow viscosities that cause difficulties loading and wetting the thermoplastic resin into the fibers. In some instances the melted thermoplastic is raised to high temperature, pulled into the fibers under high pressure, and if necessary under high vacuum, to increase the infiltration rate. At a minimum, these techniques increase the complexity and cost of producing the fiber-reinforced article and often result in a thermoplastic matrix that is poorly bonded to the reinforcing fibers. Thus, there is a need to develop new thermoplastic resin formulations and new ways to combine thermoplastic resins with reinforcing fibers. These and other issues are addressed in the present application.

BRIEF SUMMARY

Methods of making and using prepregs in the construction of fiber-reinforced composite articles are described. The present prepregs include thermoplastic resin delivered to a fiber-containing substrate as a mixture of resin particles in a liquid medium. The resin particles include thermoplastic polymers such as a polyamide polymer (e.g., nylon-6) and/or polyalkylene terephthalate. The thermoplastic polymers may also be blended with pre-polymerized monomers and/or oligomers, such as cyclic alkylene terephthalate monomers and oligomers.

The fiber-containing substrate coated with the resin mixture may be treated to form the prepreg. Treatment steps may include removing the liquid medium, for example by evaporation. They may also include heating the combination of substrate and resin particles, and in some instances melting them. They may further include partially-polymerizing pre-polymerized particles in the resin, should any be present, through heat and/or catalysis.

In some instances, polymer particles embedded in the fiber-containing substrate may be joined by a layer of thermoplastic resin laid over the coated substrate. The thermoplastic layers increase the plastic content of the prepreg using economically made layers (e.g., sheets, films) of thermoplastic resin. The thermoplastics used to make these layers may include the same or different polymers that make up the polymer particles incorporated into the fiber-containing substrate. Embodiments may also include stacked prepregs made from alternating layers of the coated substrate and films of thermoplastic resin.

The prepregs may be used to make thermoplastic fiber-reinforced articles such as automotive parts, airplane parts, and turbine blades, among other articles. Because the polymer resin is already present in the prepregs, less or no thermoplastic resin has to be injected into fiber-containing substrate, which mitigates a common problem thermoplastic resins have infiltrating and wetting substrate fibers.

An exemplary resin mixture may include resin particles of a polyamide polymer in an aqueous mixture. The resin particles are insoluble in water and may be dispersed in the aqueous medium, for example as a dispersion. The resin mixture may also contain pre-polymerized monomers and/or oligomers that form additional polymeric resin when cured.

An exemplary fiber-containing substrate is a woven fabric (e.g., woven carbon fiber, woven fiberglass, etc.). After the resin mixture of polymer particles in a liquid medium is poured, dipped, sprayed, coated, etc., on the woven fabric, it may be heated to evaporate off the liquid and leave behind a coating of the polymer particles. In some embodiments, the polymer particles are coarse enough to remain close to the fabric surface, while in other embodiments the particles are fine enough to penetrate through the exposed surface of the fabric. In some embodiments, the amount of heat applied to the coated fabric may be enough to melt the polymer particles and form a prepreg of melted particles and fabric. Additional embodiments include a prepreg of unmelted or partially-melted resin particles coated on and integrated into the fabric.

Embodiments of the invention include methods of making a prepreg. The methods may include the steps of forming a fiber-containing substrate, and contacting the fiber-containing substrate with a resin mixture. The resin mixture may include polymer particles mixed in a liquid medium, and the particles may be coated on the fiber-containing substrate to form a coated substrate. The liquid medium may be removed from the coated substrate to form the prepreg.

Embodiments of the invention further include methods of making fiber-reinforced composite articles with the prepregs. The method may include the step of contacting a fiber-containing substrate with a resin mixture of resin particles dispersed in a liquid medium, where the resin particles are polymer particles. The resin particles may be dried and melted on the fiber-containing substrate to make a prepreg comprising resin and the fiber containing substrate. The prepreg may then be formed into the fiber-reinforced composite article.

Embodiments of the invention still further include method of forming a resin mixture. The methods include incorporating a thermoplastic polymer and a cyclic alkylene terephthalate into an aqueous medium. The incorporated thermoplastic polymer and cyclic alkylene terephthalate is in the form of solid particles in the aqueous medium.

Embodiments of the invention still further include prepregs that include resin particles coated on a fiber-containing substrate. The resin particles may be thermoplastic polymer particles that have been coated on the fiber-containing substrate from a resin mixture of the resin particles dispersed in a liquid medium.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION

Methods are described for making exemplary resin mixtures that may be used to make exemplary prepregs, which in turn may be used to make exemplary fiber-reinforced composites. Also described are exemplary resin mixtures, prepregs, and fiber-reinforced composites themselves. The resin mixtures may include a particulate phase of the resin particles dispersed in a continuous phase of a liquid medium. The prepregs may include combinations of the resin with a fiber-containing substrate, such as a woven fabric made of carbon and or glass fibers. The prepregs may be shaped and arranged in a template, mold, etc., and treated to form the fiber-reinforced composites. Exemplary fiber-reinforced composites may include turbine blades for windmills, wings for aircraft, and a variety of other types of fiber-reinforced composite parts.

Exemplary Methods of Making Resin Mixtures

Figure 1:
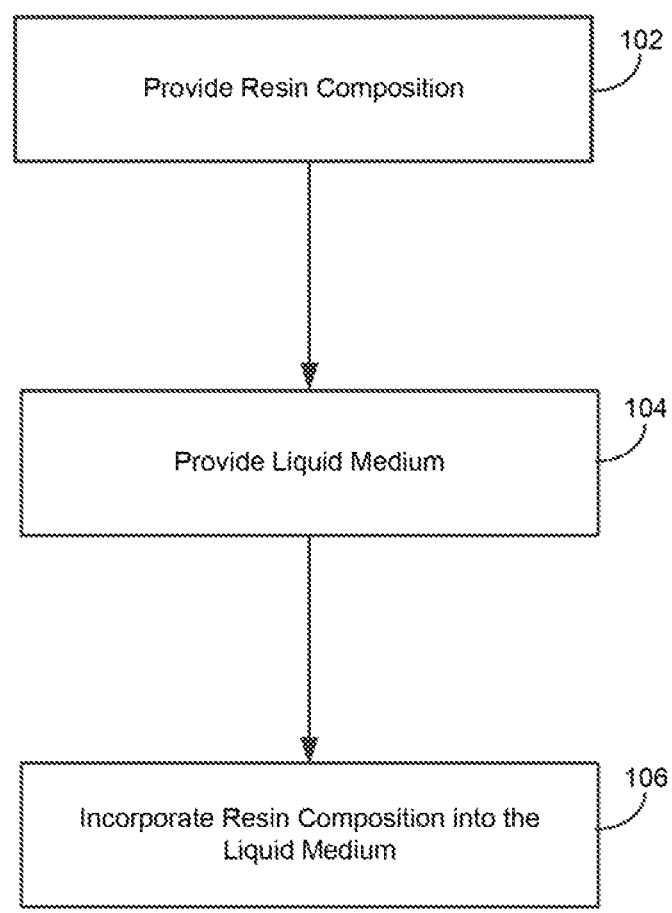
FIG. 1 is a flowchart showing selected steps in a method of making a resin mixture according to embodiments of the invention.

FIG. 1 shows selected steps in a method 100 of making a resin mixture that can be used to form a prepreg. The method 100 includes the step of providing the resin composition 102. The resin composition includes particles of a thermoplastic polymer material (i.e., a thermoplastic resin). Exemplary thermoplastic polymers include polyamide polymers (e.g., nylon-6, nylon-6,6), polybutylene terephthalate (PBT) polymers, acrylic polymers, polyethylene polymers, polypropylene polymers, polystyrene polymers, and polyvinyl chloride polymers, among other kinds of thermoplastic polymers.

In addition to the thermoplastic polymer(s), resin composition may also optionally include one or more pre-polymerized monomers, partially-polymerized oligomers, and partially-polymerized polymers. Exemplary pre-polymerized monomers and/or oligomers may include cyclic alkylene terephthalates. One exemplary group of cyclic alkylene terephthalates is cyclic butylene terephthalate (CBT). An exemplary CBT, whose ring includes two butyl groups and two terephthalate groups, is illustrated below:

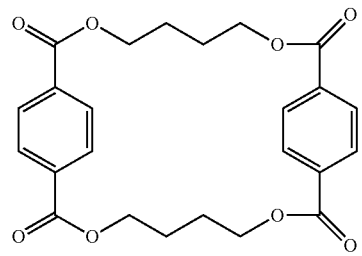 [SMILES: O=C1OCCCCOC(=O)c2ccc(cc2)C(=O)OCCCCOC(=O)c2ccc1cc2]

It should be appreciated that the present CBT may include additional butyl and/or terephthalate groups incorporated into the ring. It should also be appreciated that some exemplary CBT may have other moieties coupled to the CBT ring. CBT may comprise a plurality of dimers, trimers, tetramers, etc., of butylene terephthalate.

When the CBT monomers and/or oligomers are exposed to polymerization conditions such as elevated temperature (e.g., about 170° C. to about 250° C.) in the presence of a polymerization catalyst, the rings will open and react to create a linear polybutylene terephthalate (PBT) polymer. The polymerization reaction is reversible, and under certain conditions the PBT polymer can be converted back into cyclic monomers and oligomers of CBT. PBT polymers are sometimes referred to as the polymerized form of CBT or pCBT.

The method 100 also includes the step of providing a liquid medium 104 for the resin mixture. The liquid medium may be a room temperature liquid that can form a dispersion of the resin particles without substantially dissolving the particles. For example, when the resin particles are made of water-insoluble thermoplastic polymers, the liquid medium may be water.

The liquid medium may include additional compounds such as thickeners, dispersants, colorants, surfactants, flame retardants, ultraviolet stabilizers, and fillers including inorganic particles and carbon nanotubes, among other additional compounds. If the resin particles include pre-polymerized monomers and/or oligomers, the liquid medium may further include polymerization catalysts and/or polymerization promoters. The polymerization catalyst may include a salt and/or acid that can be partially or fully dissolved, or dispersed, in the liquid medium. When the resin particles are monomers or oligomers of a cyclic alkylene terephthalate, the polymerization catalyst is selected to drive the polymerization of these types of macrocyclic oligoesters. Exemplary polymerization catalysts may include organometallic compounds such as organo-tin compounds and/or organo-titanate compounds. One specific polymerization catalyst for the CBT monomers and oligomers that may be butyltin chloride dihydroxide.

Alternatively, when the resin particles include pre-polymerized monomers and/or oligomers, the polymerization catalysts may be incorporated onto the fibers (e.g., carbon fibers, glass fibers, etc.) in the fiber-containing substrate. For example, glass or carbon fibers may be treated with a polymerization catalyst composition (e.g., a sizing composition) that coats the fibers with the polymerization catalyst. When the monomers and/or oligomers in the resin material make contact with the treated fibers at the polymerization temperature, the polymerization catalyst on the fibers facilitate the polymerization of this portion of the resin into a polymerized resin matrix. In some instances, application of the polymerization catalyst on the fibers of the fiber-containing substrate eliminates the need to incorporate the polymerization catalyst into the resin or the liquid medium of the resin mixture. This may be advantageous when the polymerization catalyst is not easily dissolved and/or dispersed in either the polymer resin or liquid medium. For example, the sizing/coating composition of the polymerization catalyst may use a different solvent than the liquid medium, a solvent that would otherwise be undesirable to include in the resin mixture.

The polymerization catalyst may also be optionally accompanied by a polymerization promoter that accelerates the polymerization rate of the monomers and/or oligomers. When the resin particles include CBT, the polymerization promoter may by an alcohol and/or epoxide compound. Exemplary alcohols may include one or more hydroxyl groups, such as mono-alcohols (e.g., butanol), diols (e.g., ethylene glycol, 2-ethyl-1,3-hexanediol, bis(4-hydroxybutyl)terephthalate), triols, and other polyols. Exemplary epoxides may include one or more epoxide groups such as monoepoxide, diepoxide, and higher epoxides, such as bisphenol A diglycidylether. They may also include polyol and polyepoxides, such as poly(ethylene glycol).

The method 100 also includes incorporating the resin composition into the liquid medium 106 to form the resin mixture. The thermoplastic polymer may be incorporated into the liquid medium as a liquid, a solid, or both. Introducing the resin composition as a liquid may include heating the resin to its melting temperature and pouring or injecting the melted resin into the liquid medium to form an emulsion. In many instances, melted resin is cooled on contact with the liquid medium, causing the resin to solidify.

When the resin particles are made of polyamide polymers such as nylon-6, they begin to melt at about 220° C. (428° F.). Another exemplary polyamide polymer, nylon-6,6, melts at a slightly higher temperature of 265° C. (509° F.). When the melted nylon is introduced to an aqueous medium, it rapidly cools and solidifies into a dispersion of nylon resin particles. For PBT resin particles, the melting point is typically around 225° C., so the polymer melt may be blend of nylon and PBT where the blend of polymers have comparable melting points.

In some examples, the resin particles may also include pre-polymerized monomers and/or oligomers in addition to the thermoplastic polymers. For example, the resin particles may include CBT resins that are solid at room temperature (e.g., about 20° C.), and begin to melt at around 120° C. At around 160° C., CBTs are generally fully melted with a liquid viscosity of about 150 centipoise (cP). As the molten CBTs are heated further, the viscosity may continue to drop, and in some instances may reach about 30 cP at about 190° C. However, the viscosity can start to climb as the CBT starts polymerizing to PBT. Temperature ranges for CBT polymerization are generally about 170° C. to about 250° C., with higher temperatures rapidly increasing the polymerization rate.

The CBT may be melted around 120-160° C. and introduced to an aqueous medium separately from the higher melting point thermoplastic polymer(s). The two types of resin particles may be formed from two different streams of melted resin being introduced to the liquid medium. Alternatively, the polymer and pre-polymerized resins may start as a blend of solids that are added to the liquid medium at different melt temperatures. As the blend of solids is heated to the 120-160° C. range, a melt made primarily from monomers and oligomers are poured into the liquid medium. As the blend of solids is further heated to the melting point of the thermoplastic polymers (e.g., greater than 200° C.), a melt that includes more liquid polymers is poured into the liquid medium.

In some instances a polymerization catalyst for the CBT may be added to the resin mixture after the resin particles form to minimize the extent CBT polymerization. However, because the CBT emulsion cools quickly in the aqueous medium a polymerization catalyst may be mixed with the water even before the emulsion is formed. In still other instances, a polymerization catalyst may be present in the melted CBT resin before forming the emulsion with the aqueous medium.

Additional techniques for incorporating the resin composition into the liquid medium include dispersing solid particles of the resin composition into the liquid medium. When the resin composition is a solid at room temperature, it may be ground, milled, or otherwise formed into dispersible particles that are added to the liquid medium. For example, commercial sources of thermoplastic resins are commonly sold as pellets that can be ground into fine particles with average particle diameters of about 1 µm to about 50 µm. The fine particles may then be dispersed into an aqueous medium to form the resin mixture.

The resin mixtures may be used to form prepregs that are the starting materials of fiber-reinforced composites. The present prepregs are fiber-containing materials that have been pre-impregnated with thermoplastic polymers that contribute to the formation of the resin matrix in a fiber-reinforced composite made with the prepregs. When the prepregs are formed exclusively from thermoplastic polymers that do not undergo further polymerization, they are typically referred to as "C-stage" prepreg. Alternatively, if the prepreg contains a significant portion of uncured monomer and/or oligomer that has undergone some polymerization, but is not completely polymerized, it may be referred to as "B-stage" prepreg.

Exemplary Methods of Making Prepregs

Figure 2:
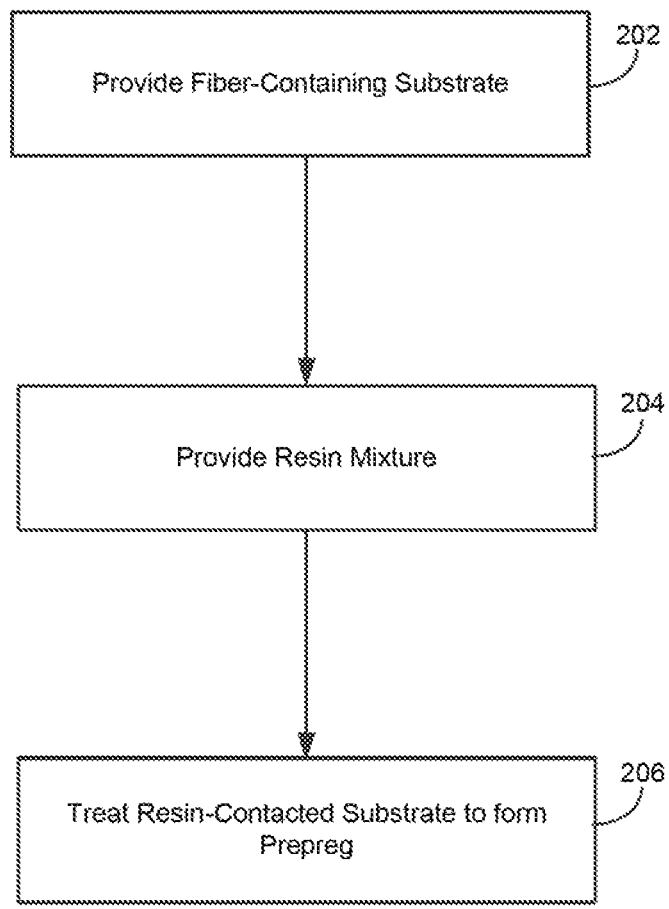
FIG. 2 is a flowchart showing selected steps in a method of making a prepreg according to embodiments of the invention.

FIG. 2 is a flowchart showing selected steps in a method 200 of making such a prepreg. The method 200 may include the step of providing a fiber-containing substrate 202 that used to make the prepreg. Exemplary fiber-containing substrates may include woven fabrics, multiaxial fabrics, stitched fabrics, and non-woven fabrics, among others. The fabrics may be made out of one or more types of fibers, such as glass fibers, basalt fibers, carbon fibers, polymer fibers (e.g., aramide fibers), and natural fibers (e.g., cellulose fibers), among other types of fibers. For example, individual carbon filaments may form a tow, which is woven into a fabric that acts as the fiber-containing substrate 202.

The method 200 also includes providing a resin mixture 204. The resin mixture may be made according to the method 100 described above, and may include a combination of resin particles dispersed in a liquid medium.

The fiber-containing substrate may be contacted with the resin mixture and the resin-contacted substrate may be treated to form the prepreg 206. Techniques for contacting the fiber-containing substrate with the resin may include applying the resin mixture to the substrate by spraying, curtain coating, spin coating, blade coating, dip coating, and/or roll coating, among other techniques. The resin-coated substrate may then be treated to remove some or all of the liquid medium from the resin mixture and/or melt the resin particles in the mixture.

The treatment step 206 may include heating the resin-contacted substrate under conditions conducive to evaporating the liquid medium and leaving a coating of the resin particles on the fiber substrate. In some examples, the heating temperature is set high enough to both evaporate the liquid medium and melt the resin particles. For example, if the resin mixture is an aqueous mixture of nylon particles, the heating temperature may be set somewhere in the range of about 220-270° C., which is high enough to both evaporate off substantially all the liquid water and melt the nylon particles on the substrate to form a prepreg of thermoplastic resin coating the substrate. If pre-polymerized monomers and/or oligomers are also present in the resin, the heating temperature may be set high enough to start polymerizing a portion of the resin to a B-stage. The treatment step 206 may also include techniques used in addition to or in lieu of heating to partially polymerize the pre-polymerized portion of the resin, such as exposure to ultraviolet light.

The method 200 may also include optional steps (not shown) of introducing additional compounds to the substrate and/or resin mixture. For example, it may be desirable to introduce dry resin particles directly on the substrate before and/or after the substrate is contacted by the resin mixture. These dry resin particles may be the same or different from the resin particles in the resin mixture. For example, dry resin particles of additional thermoplastic polymers and/or pre-polymerized monomers and/or oligomers may be sprinkled onto the substrate before, during or after a resin mixture of thermoplastic particles contact the substrate.

Exemplary Prepregs

Figure 3A:
FIG. 3A shows a sheet of woven polymer layers made by the present methods.
Figure 3B:
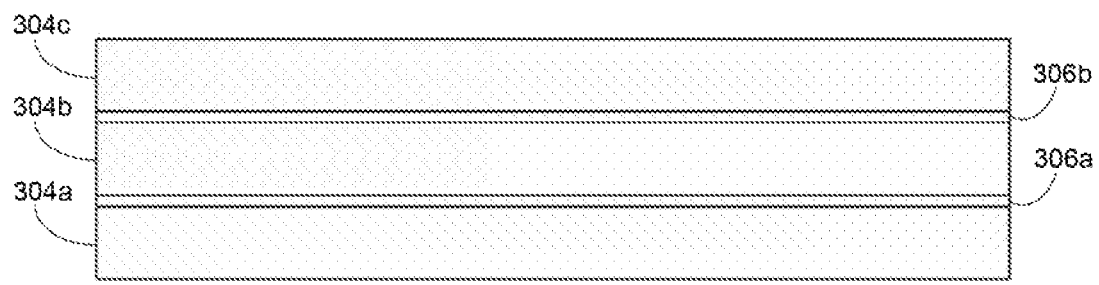
FIG. 3B shows a prepeg stack of alternating layers of coated, sized glass-fiber substrate and thermoplastic layers made by the present methods.
Figure 3C:
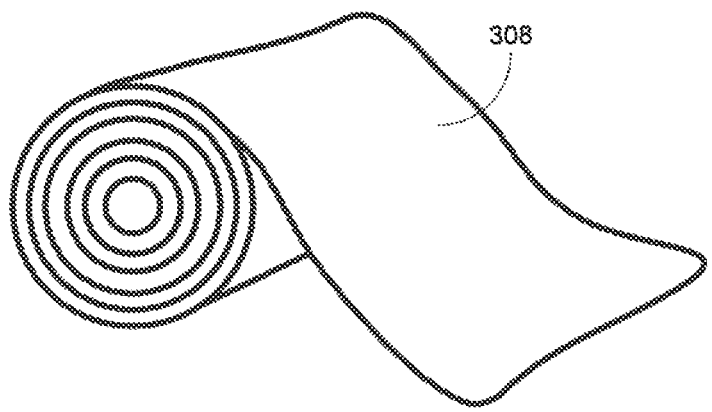
FIG. 3C shows a roll of prepreg material made by the present methods.

FIGS. 3A-C show some exemplary prepregs made using the present methods. FIG. 3A shows a sheet 302 of woven fabric (e.g., woven carbon fibers, woven glass fibers, etc.) and resin particles. The sheet 302 may be heated to the melting temperature of the resin particles, permitting them to wet the fibers of the woven fabric and produce a prepreg sheet having a continuous resin phase.

FIG. 3B shows a prepreg stack of alternating layers of coated fiber substrate 304a-c and thermoplastic polymer layers 306a-b. The embodiment shown has the thermoplastic polymer layers 306a-b sandwiched between the coated fiber substrates 304 a-c. Also contemplated are prepreg stacks where the coated fiber substrates are sandwiched between layers of thermoplastic polymer. The coated fiber substrates 304a-c and/or the thermoplastic polymer layers 306a-b may be sufficiently sticky to hold the prepreg stack together without the application of adhesive. Alternatively, an adhesive may be applied to one or more surfaces of one or more of the layers so they adhere together. In additional embodiments, the coated fiber substrates 304a-c and the thermoplastic polymer layers 306a-b may be bonded together by compressing and/or heating the stack.

FIG. 3C shows a roll 308 of prepreg material that may be used as sheet molding compound (SMC), among other applications. In some embodiments, the prepreg material may be sandwiched between film layers that prevent contamination of the prepreg as well as the bonding of adjacent layers on the roll. The film layers are selected to easily peel away from the prepreg when it is ready to be used in making fiber-reinforced articles. Alternatively, the film layers may be compatible with the prepreg, and incorporated in the composite part after molding.

Exemplary Methods of Making Fiber-Reinforced Composite Articles

Figure 4:
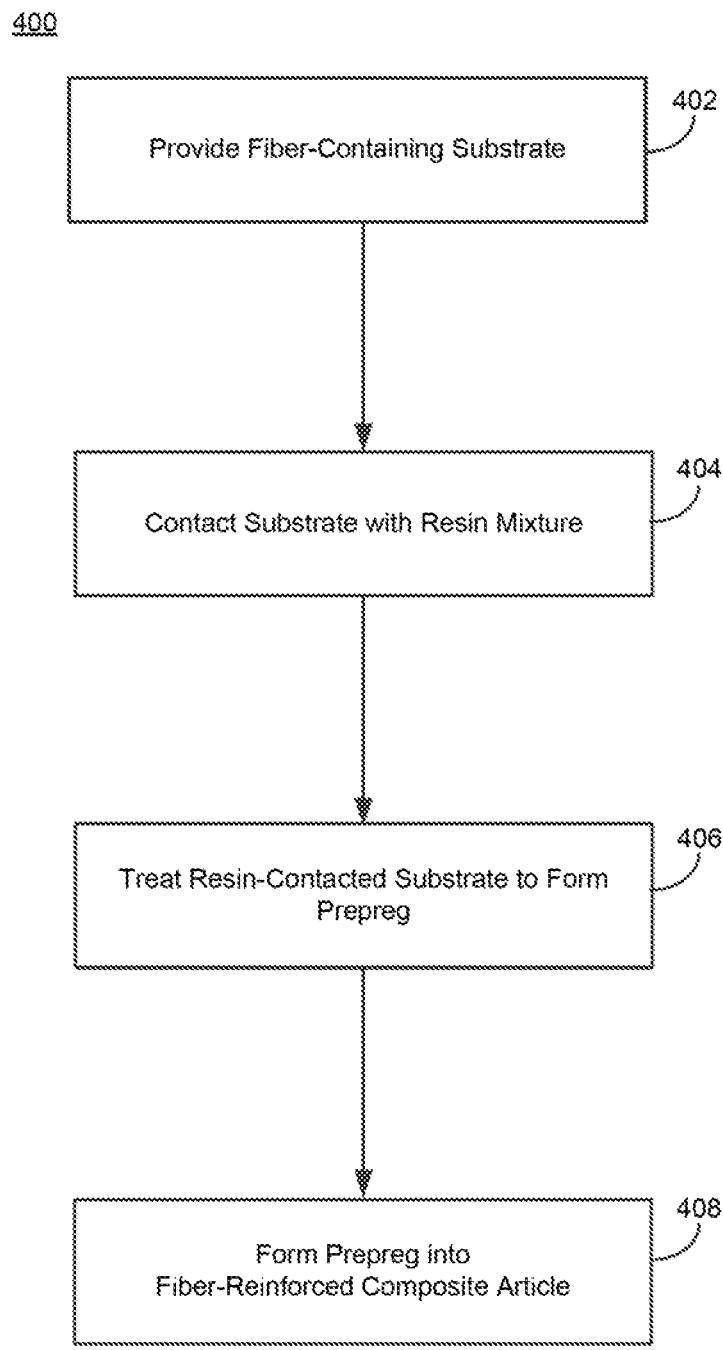
FIG. 4 is a flowchart showing selected steps in a method of making a fiber-reinforced article according to embodiments of the invention.

The prepregs may be used in methods of making a fiber-reinforced article like the method 400 illustrated in FIG. 4. The method 400 includes the steps of providing a fiber-containing substrate 402. As noted above, exemplary fiber-containing substrates may include woven fabrics, multiaxial fabrics, stitched fabrics, and non-woven fabrics, among others. The substrate may be contacted with a resin mixture 404 that delivers resin particles to the substrate. The resin-contacted substrate may then be treated to form the prepreg 406.

The resulting prepreg may be formed into a fiber-reinforced composite article 408 through a variety of techniques. For example a single layer or multiple layers of the prepreg may be compression molded into the fiber-reinforced article. When the prepreg includes pre-polymerized and/or partially-polymerized resin, the compression molding process may include a heating step (e.g., hot pressing) to fully polymerize the resin. Heat may also be used in the compression molding of fully-polymerized prepregs to melt and mold the prepreg into the shape of the final article.

The prepregs may also be used to in conjunction with other fibers and resin materials to make the final composite article. For example, the prepreg may be placed in selected sections of a tool or mold to reinforce the article and/or provide material in places that are difficult to reach for thermoset and/or thermoplastic resins. For example, the prepregs may be applied to sharp corners and other highly structured areas of a mold or layup used in reactive injection molding processes (RIM), structural reactive injective molding processes (SRIM), resin transfer molding processes (RTM), vacuum-assisted resin transfer molding processes (VTRM), spray-up forming processes, filament winding processes, long-fiber injection molding processes, and pultrusion, among others.

As noted above, the prepregs may include resin particles made from both thermoplastic polymers and pre-polymerized resins. Exemplary pre-polymerized resins may include partially-polymerized CBT monomers and/or oligomers that can be converted to a fully-polymerized fiber-reinforced article under isothermal processing conditions. For example, the prepreg may include resin particles made from a blend of polymerized PBT and pre-polymerized CBT monomers and/or oligomers. The PBT may come from recycled and/or less expensive sources than the CBT, so substitution of a significant portion of the CBT with PBT can reduce the overall production costs of the prepreg. Similarly, a blend of a polyamide polymer (e.g., nylon-6, nylon-6,6) and CBT may be used to produce less expensive prepregs than possible using CBT alone as the resin material.

As noted above, the CBT monomers and oligomers have melting points that start as low as 120° C. and significant polymerization rates starting at about 170° C. Because polymerized PBT has a higher melting point of around 225° C., the CBT can be melted and polymerized into a solid PBT matrix at the same temperature without a cooling stage prior to demolding. The isothermal processing of the prepreg (e.g., processing at a temperature between about 170° C. and 200° C.) can significantly speed production of the fiber-reinforced article, especially for larger volume articles that normally require longer cooling periods for the melted thermoplastic.

Exemplary Fiber-Reinforced Composite Articles

Figure 5:
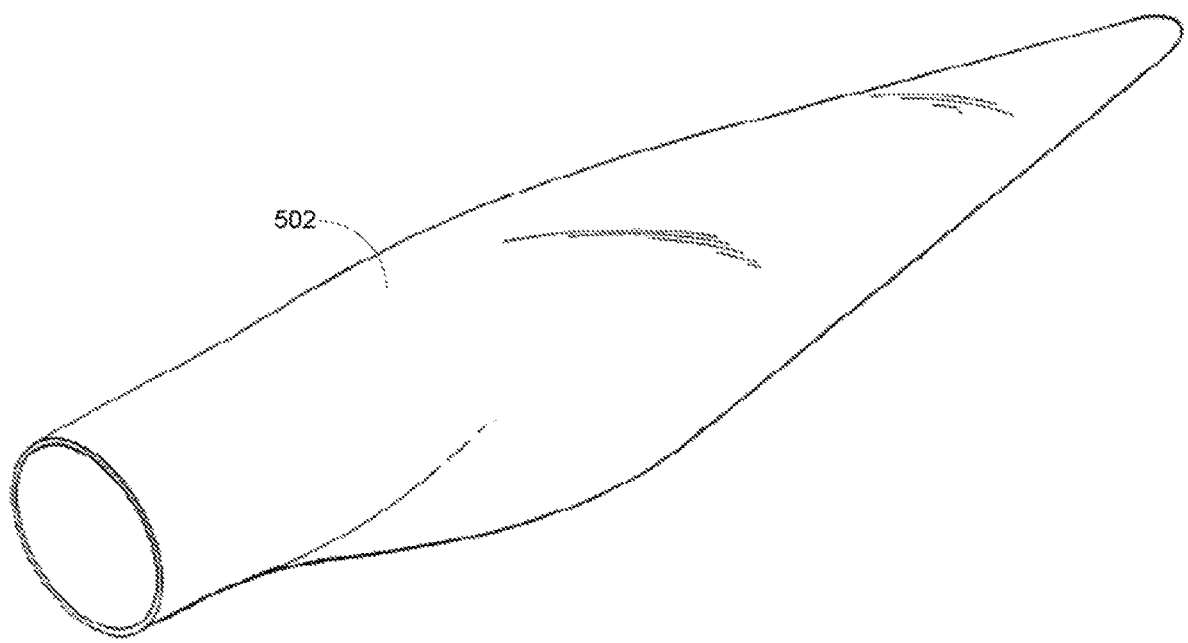
FIG. 5 shows exemplary fiber-reinforced articles made by the present methods.

FIG. 5 shows an exemplary fiber-reinforced composite wind turbine blade 502 formed by the present prepregs. The blade 502 is one of many types of articles that can be formed by the present prepregs. Other articles may include vehicle parts (e.g., aircraft parts, automotive parts, etc.), appliance parts, containers, etc.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the electrode" includes reference to one or more electrodes and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A prepreg comprising:
a fiber-containing substrate; and
resin particles comprising a first plurality of particles and a second plurality of particles, wherein the resin particles are coated on the fiber-containing substrate from a resin mixture containing the resin particles dispersed in a liquid medium, wherein:
the first plurality of particles consist of a thermoplastic polymer, and
the second plurality of particles consist of pre-polymerized particles consisting of at least one of monomers or oligomers.

2. The prepreg of claim 1, wherein the thermoplastic polymer comprises a polyamide polymer.

3. The prepreg of claim 2, wherein the polyamide polymer comprises nylon-6 or nylon-6,6.

4. The prepreg of claim 1, wherein the thermoplastic polymer comprises polybutylene terephthalate.

5. The prepreg of claim 1, wherein the fiber-containing substrate comprises a woven fabric, a multiaxial fabric, a stitched fabric, or a nonwoven fabric.

6. The prepreg of claim 1, wherein the monomers or oligomers comprise a cyclic alkylene terephthalate.

7. The prepreg of claim 6, wherein the cyclic alkylene terephthalate comprises cyclic butylene terephthalate.

8. The prepreg of claim 1, wherein the prepreg does not comprise water.

9. The prepreg of claim 1, wherein the fiber-containing substrate comprises glass fibers, basalt fibers, carbon fibers, polymer fibers, or natural fibers.

10. The prepreg of claim 1, wherein the fiber-containing substrate comprises aramid fibers or cellulose fibers.

11. The prepreg of claim 1, wherein the resin particles have an average particle diameter of 1 μm to 50 μm.

12. The prepreg of claim 1, wherein the fiber-containing substrate comprises a polymerization catalyst.

13. The prepreg of claim 1, further comprising:
a layer of thermoplastic polymer,
wherein:
the fiber-containing substrate contacts the layer of thermoplastic polymer.

14. The prepreg of claim 13, wherein the thermoplastic polymer comprises a polyamide polymer.

15. The prepreg of claim 13, wherein:
the layer of thermoplastic polymer is a first layer of thermoplastic polymer,
the fiber-containing substrate is a first fiber-containing substrate,
the prepreg further comprising:
a second fiber-containing substrate contacting the first layer of thermoplastic polymer, and
a second layer of thermoplastic polymer contacting the second fiber-containing substrate.

16. The prepreg of claim 15, wherein the prepreg does not comprise an adhesive.

17. The prepreg of claim 15, wherein the second thermoplastic polymer comprises a polyamide polymer.

18. The prepreg of claim 17, wherein the polyamide polymer comprises nylon-6 or nylon-6,6.

19. The prepreg of claim 1, wherein the prepreg is in a roll product.

* * * * *